United States Patent [19]
Bach et al.

[11] 3,743,302
[45] July 3, 1973

[54] SEALING ARRANGEMENT

[75] Inventors: Meinhard Bach, Bobenheim-Roxheim; Friedrich Urban, Frankenthal, both of Germany

[73] Assignee: Klein Schanzlin & Becker Aktiengesellschaft, Frankenthal, Germany

[22] Filed: Dec. 29, 1971

[21] Appl. No.: 213,476

[52] U.S. Cl. ........................ 277/10, 277/38, 277/65
[51] Int. Cl. ............................................. F16j 15/34
[58] Field of Search .................. 277/9, 9.5, 10, 11, 277/38, 81, 85, 65

[56] References Cited
UNITED STATES PATENTS

| | | | |
|---|---|---|---|
| 1,872,498 | 8/1932 | Rasmussen et al. | 277/10 |
| 1,896,795 | 2/1933 | Kendall | 277/11 |
| 3,460,844 | 8/1969 | Whittle | 277/85 |
| 3,620,554 | 11/1971 | Ward et al. | 277/11 |

Primary Examiner—George E. Lowrance
Assistant Examiner—Robert I. Smith
Attorney—Michael S. Striker

[57] ABSTRACT

A rotary shaft is surrounded by a sleeve which is rotatable with it and which is in turn surrounded over all but an axial end portion by an inner annular housing. The axial end portion is provided with an external circumferential groove and the inner annular housing has in the region of this groove a radially directed outward flange which is connected with an outer annular housing surrounding the inner annular housing. A circlip is accommodated in a circumferential recess provided in the shaft adjacent an end of the sleeve and the circlip engages the sleeve to prevent its axial displacement with reference to the shaft. Temporary coupling devices are provided on the inner annular housing and can be moved into and out of the groove in the sleeve to thereby temporarily and releasably couple the inner annular housing with the sleeve.

9 Claims, 5 Drawing Figures

SEALING ARRANGEMENT

BACKGROUND OF THE INVENTION

The present invention relates generally to a sealing arrangement and more particularly to a mechanical sealing arrangement for use on a rotor.

Many rotors, which term includes rotatable shafts and analogous members, must be provided with suitable sealing arrangements, generally called shaft-seals. A problem attendant in all known constructions of this type has to do with the work required for installing the seals on the rotor that is the shaft or the like, and the adjustment of the rotor, with reference to the seal, particularly in such apparatus as for instance rotary pumps. In all such instances, the adjustments and manipulations required are relatively complicated which means that the installation and inspection times necessarily are long and that the installations and inspections are expensive. Furthermore, in these shaft seals which utilize sliding ring seals there is usually inadequate protection afforded against damage to these sliding ring seals which are highly susceptible to such damage.

Additional disadvantages existing in the prior art include the fact that after repair or inspection, time consuming adjustments must frequently be carried out in order to obtain the same rotor position as before, so as to avoid a change in the hydraulic axial pressure. Furthermore during repair and inspection, the pump chamber itself — if a pump is involved — must be emptied or released of pressure, particularly in the case of liquids having very steep saturation characteristics and in the case of liquids or fluids which are poisonous or noxious, and also in the case of liquids or fluids which are expensive. A particular disadvantage is constituted by this last requirement in the case of pumps which pump liquefied gases at minus temperatures, because the emptying of the pump chamber or pressure release therefrom is very time consuming and a re-liquefication of the gas is very expensive.

SUMMARY OF THE INVENTION

It is, accordingly, an object of the present invention to overcome the disadvantages of the prior art.

More particularly, it is an object of the present invention to provide an improved arrangement of the character here under discussion which is not possessed of these disadvantages.

Another object of the invention is to provide such an improved arrangement which is highly reliable in operation and can be manipulated and adjusted rapidly and with little expense and experience.

In pursuance of these and other objects which will still become apparent hereafter, one feature of the invention resides in an arrangement of the character here under discussion, which briefly stated comprises a rotor and sliding ring seal means including a sleeve surrounding a portion of the rotor rotatable therewith and having a main portion and an end portion which is provided with an external circumferential groove. An inner annular housing surrounds the main portion and has an outwardly directed radial flange in the region of the end portion, and an outer annular housing surrounds the inner annular housing and has an annular end face axially juxtaposed with the flange. Connecting means is provided for releasably connecting the flange with the outer annular housing, and retaining means is provided for retaining the sleeve against axial movement relative to the rotor and inner annular housing. In addition, there is provided temporary coupling means carried by the inner annular housing in the region of the flange thereof and movable to and from a position in which it extends into the groove of the sleeve for thereby temporarily coupling the inner annular housing with the sleeve against relative axial displacement.

By resorting to the present invention the actual sealing means itself is capable of participating in an axial displacement of the rotor to the extent necessary for requisite adjustments of the arrangement. The torque is transmitted to the rotating components of the sliding ring sealing means by suitable connection with the rotor, for instance by a Woodruff key. The invention assures that only very short installation and inspection times are necessary and that all necessary installations and inspections can be carried out in a very simple and highly efficient manner. Furthermore, maximum protection can be afforded in this way to the sliding ring seal components against damage while inspection or installation operations are carried out.

With the present invention it is assured that after an inspection the rotor will assume precisely the same position with reference to the remainder of the arrangement as it had before the inspection, without having to carry out any measuring or adjustment operation, so that a change in the direction of the hydraulic forces acting upon the rotor or the rotor system is precluded.

It is advantageous according to a further concept of the invention to provide a stationary auxiliary sealing arrangement which is utilized only when the rotor is stationary, that is during repair, and inspection or similar work, and which provides for sealing with respect to the rotor during such operation, thereby obviating any necessity for emptying or de-pressurizing the pump chamber is the arrangement is used in connection with a pump. This is particularly advantageous in the case of pumps which act upon liquids at minus temperatures because of the time consuming emptying or depressurizing and subsequent re-liquefication of a gas (if a gas was involved) are avoided. The invention has still an additional advantage in that a pre-assembled sealing unit can be maintained on hand in case of urgent emergencies and in the event that the already installed unit on the rotor should become defective. This of course greatly reduces the time involved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
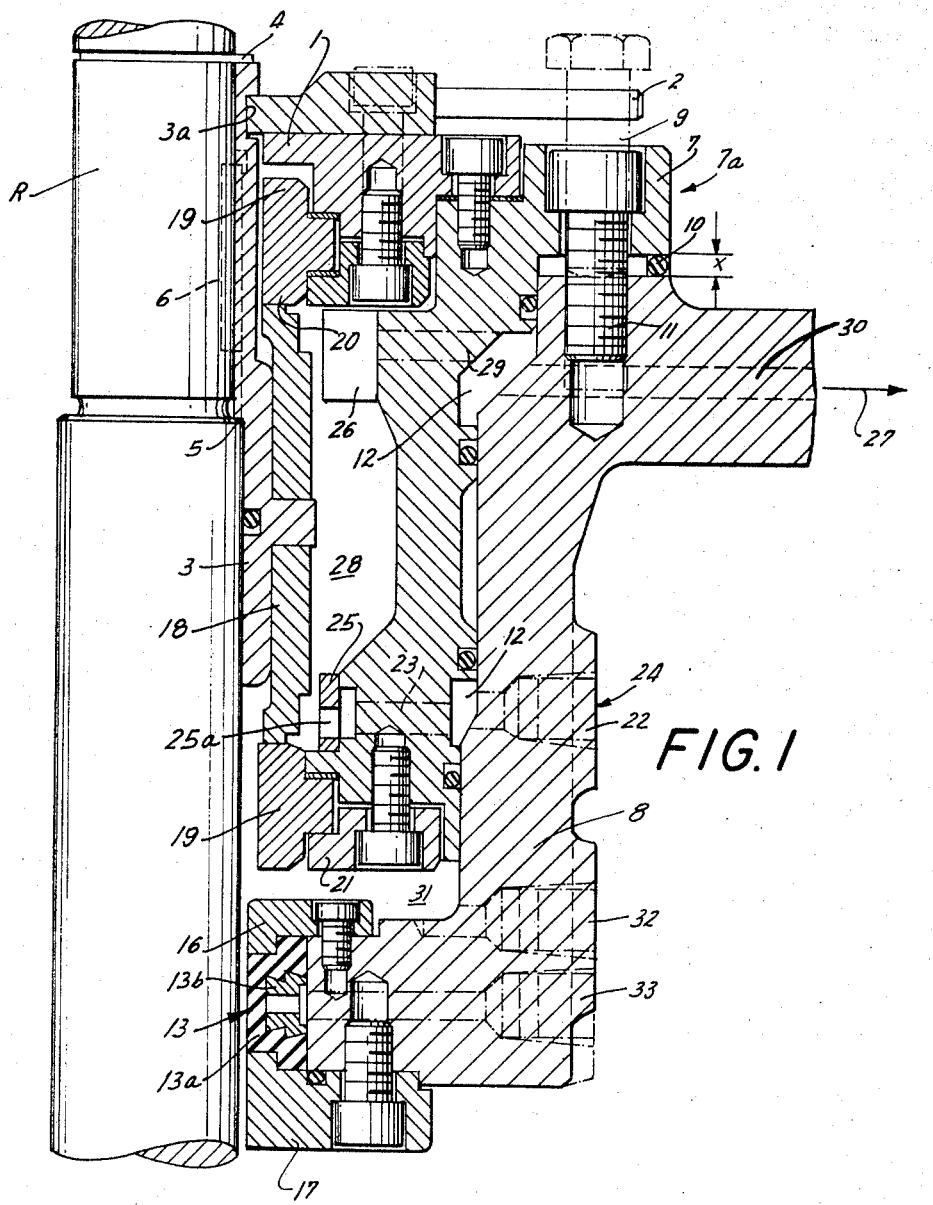
FIG. 1 is a fragmentary axial section through an arrangement according to the present invention, it being understood that the rotor is shown in its entire width transverse to its axis of rotation but that only the right-hand part of the annular sealing arrangement itself is illustrated, whereas the non-illustrated left-hand part is symmetrical relative thereto.

For purposes of explanation — but not in any sense in a limiting manner — it will be assumed herein that the rotor R in FIGS. 1 – 5 is a rotary shaft having a vertical orientation as in FIG. 1, and is for instance a part of a rotary pump. The angular displacement through 90° towards the left in FIGS. 2 – 4 with respect to the illustration in FIG. 1 has been chosen for space-saving reasons, although it should be understood that the rotor could of course be oriented horizontally or at an angle of inclination to the horizontal other than normal.

Discussing the drawing now in detail and firstly FIG. 1 thereof, it will be seen that the sealing unit itself is temporarily coupled with the rotor R by means of two eccenter arresting devices 2 mounted on the upper removable cover 1 of a sealing housing or inner housing 7 which is surrounded by an outer housing 8, and on which cover 1 the devices 2 are mounted for pivoting movement about the pivots 2a (see FIG. 5) to and from a position (the broken-line position of FIG. 5) in which they extend in part into a circumferential groove 3a provided in the outer circumference of an end portion of a sleeve 3 which surrounds a part of the rotor R (see FIG. 1) and is fixedly connected therewith so that it will rotate with the rotor R for instance by means of the diagrammatically illustrated Woodruff key 6.

The sleeve 3, which constitutes a part of the sliding ring seal means, is prevented from axial movement with reference to the rotor R by a circlip 4 which is lodged in a groove provided in the periphery of the rotor R, (See FIG. 1) as well as by a shoulder 5 of the rotor R which cooperates with a similar shoulder of the sleeve 3.

The rotating sliding ring seal components 18 are mounted on the sleeve 3 and rotate with the same, and they as well as the stationary sliding ring seal components 19 are accommodated in the inner housing 7. The components 19 are mounted or retained by covers 20 and 21 provided at opposite axial ends of the inner housing 7. A flange 7a of the inner housing 7 extends radially outwardly and overlies an axially juxtaposed annular end face of the outer housing 8 with which it indirectly abuts and to which it is connected. Adjustment of the rotor system R is effected via the flange 7 when the devices 2 are in their respective (broken-line) position shown in FIGS. 1 and 5.

After a single initial adjustment which is carried out with several adjusting screws 9 as will be discussed later, the rotor system R is supported on the axial end face of the outer housing 8 via a two-part spacing ring 10 interposed between this axial end face and the flange 7a and having an axial length X (see FIG. 1) corresponding to the adjusted position which it is desired to obtain. Screws 11 then connect the flange 7a with the housing 8.

FIG. 1 shows particularly clearly that between the housing 7 and the housing 8 there are defined relatively wide (in axial direction of the rotor R) annular spaces 12 with which channels 22 and 30 of housing 8 and channels 23 and 29 of inner housing 7 communicate. A ring member 25 is located in the interior of the inner annular housing 7 being provided with a plurality of equi-angularly circumferentially distributed bores or apertures 25a as particularly clearly shown in FIG. 1. The arrangement herein disclosed utilizes a blocking liquid which is circulated through the sealing unit for lubrication and for cooling purposes; this liquid is introduced via the inlet 24 from a suitable source and fills from their via channels 22 and 23 into the ring 25 whose apertures 25a distributed evenly about the circumference of the ring 25 so that it can enter into the sealing compartment 28. A damming baffle 26 retards or dams the flow of the liquid which is then caused to flow out via the channels 29 and 30 and the outlet 27, to be returned to the liquid reservoir from where the non-illustrated source receives it for introduction into the inlet 24. Leakage fluid will collect in the space 31 and can be controlled or removed via the connection 32 which communicates with the space 31.

An auxiliary stationary seal 13 is provided which is to be utilized only if the sliding ring seal must be removed, for instance for repair or inspection. It must be understood that in FIG. 1, fluid for instance under pressure will be pressed downwardly below the lower end of the outer housing 8 which could escape between the rotor R and the lower end wall of the housing 8 into the interior of the latter and into the interior of the inner housing 7, and from there to the ambient regions if the sliding ring seal has been removed. To avoid this, the stationary auxiliary seal 13 is provided which, in the illustrated embodiment is in the form of a hollow annular member 13a of elastically distendable material, for instance natural or synthetic rubber or synthetic plastic material. The interior of this member 13a may be reinforced by an annular insert 13b of metal or suitable material, provided with passages communicating with the inlet 33 which is adapted to be connected to a source of pressurized fluid. When such pressurized fluid is admitted via the inlet 33 the member 13a will be radially inwardly distended into sealing engagement with the rotor R so that leakage into the housings 7 and 8 is precluded by the auxiliary seal 13 and the sliding ring seal can be removed from the housing 7 for inspection and/or repair if and when desired. This eliminates any necessity for removing fluid contents of the pump (assuming that the arrangement is utilized on a pump) or for depressurizing the contents, thereby in turn reducing the inspection and repair time and eliminating incidental expenses involved, for instance in re-liquefying gas which was originally present in liquid condition.

Figure 2:
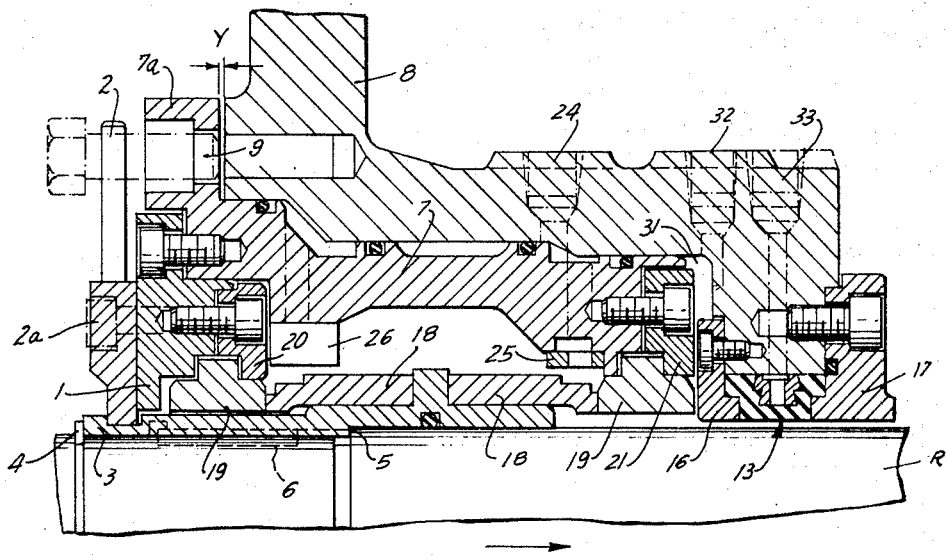
FIG. 2 is a view similar to FIG. 1, angularly displaced to the left through 90° and illustrating one adjustment stage in the adjustment of the rotor with reference to the sealing unit.

The installation of the unit on the rotor R assumed here to have a vertical orientation as in FIG. 1, will now be discussed with respect to FIGS. 2 – 5. It will be seen in FIG. 2 that the inner housing 7 with the sliding ring seal is first introduced into the outer housing 8 along the rotor R when the latter is in its lowest end position as indicated by the arrow in FIG. 2. The housing 7 is then inserted into housing 8 until sleeve 3 rests on shoulder 5. During this movement the devices are pivoted about pivots 2a from the full-line to the broken-line position of FIG. 5, so as to enter partially into groove 2a as shown in FIG. 2. This couples sleeve 3 and housing 7 for joint movement. On sealing of sleeve 3 upon shoulder 5, a circlip 4 is inserted as shown in FIGS. 1 and 2.

At this time, the amount of play Y between flange 7c and the juxtaposed end face of housing 8 (FIG. 2) is measured and a note made of it.

Figure 3:
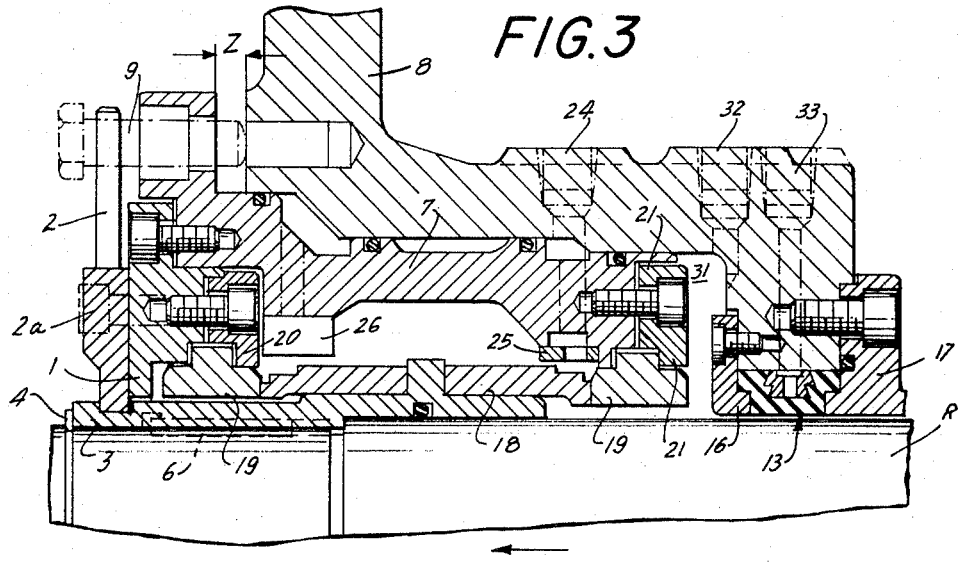
FIG. 3 is a view similar to FIG. 2 illustrating another adjustment stage.

Sleeve 3 and rotor R are then shifted by means of screws 9 which bear with their free ends on the endface of housing 8. When the rotor R has reached its highest position, the play between flange 7a and the juxtaposed axial end face of the housing 8 will be the distance Z as shown in FIG 3. This play is also measured and a note made thereof.

Figure 4:
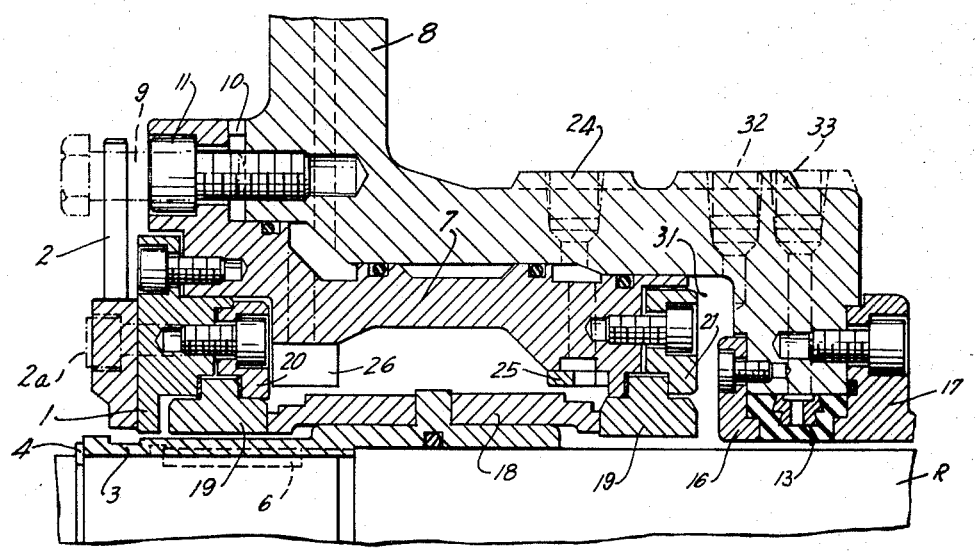
FIG. 4 is a view similar to FIG. 3 illustrating the final adjusted operating position of the arrangement shown in FIGS. 1 – 3.
Figure 5:
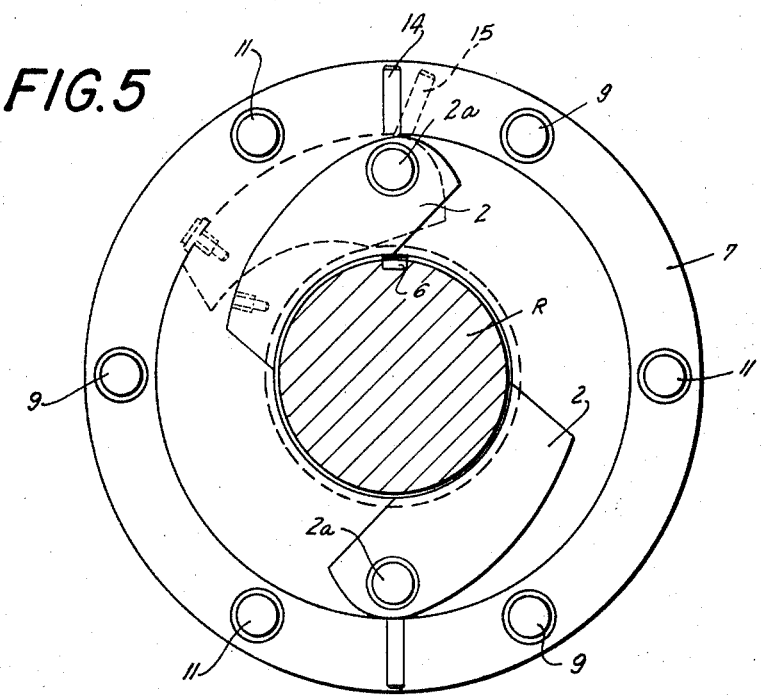
FIG. 5 is a somewhat diagrammatic end-elevational view of FIG. 4, looking towards the right in that Figure.

Of these two dimensions Y and Z the final desired operational position of the rotor R is now determined, that is the play X of FIG. 1 is calculated from them whereupon the ring 10 is provided which either has an axial length corresponding to the dimension X or is shortened from a longer configuration until it has this axial length. The ring 10, which may be of two parts or which may be after its length-adjustment severed into two parts, is not interposed between the axial end face of housing 8 and the flange 7a whereupon the housing 7 is lowered by turning the screws 9 in an opposite sense to that required previously, until the flange 7a rests on the ring 10. In this position there is no load on the screws 9 and screws or bolts 11 are now utilized for conneting the flange 7a with the housing 8 in fixed relationship therewith. At this time the frictional ehgagement of the portions of the devices 2 received in the groove 3a is usually too tight to permit the devices 2 to be pivoted to their inoperative full-line position of FIG. 5. Therefore, the rotor R is now shifted towards the left again in FIG. 4 (that is raised if it is vertically oriented by about 2-3 tenths of a millimeter so that the friction is reduced and the devices 2 can now be pivoted from their broken-line position to their full-line position in FIG. 5 in which position they are withdrawn from the groove 3a as shown in FIG. 4. The operative position which the devices 2 assume in FIGS. 1 - 3 is designated in FIG. 5 with reference numeral 15 and the inoperative position is designated with reference numeral 14.

It will be appreciated that after inspection of the sliding ring seal components, the proper positioning of the rotor R with respect to the sealing unit can be carried out without any necessity for taking measurements or making adjustments, as is clear from FIG. 1. It is merely necessary to replace the inner housing 7 into the housing 8 and then to replace the circlip 4 whereupon the flange 7a is raised by means of the screws 9 to such an extent that the previously used ring 10 can be inserted between the flange 7a and the end face of the housing 8. The screws 9 are then manipulated until the flange 7a again rests on the ring 10 and can be secured to the housing 8 by means of the screws or bolts 11.

This, it will be seen provides for a construction and an operation which avoid the disadvantages of the prior art and achieve all the objects which have been outlined above.

It will be understood that each of the elements described above, or two or more together, may also find a useful application in other types of constructions differing from the types described above.

While the invention has been illustrated and described as embodied in a mechanical shaft seal arrangement, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention and therefore, such adaptations should and are intended to be cmprehended within the meaning and range of equivalence of the following claims.

What is claimed as new and desired to be protected by Letters Patent is set forth in the appended claims.

We claim:

1. An arrangement of the character described, comprising a rotor; sliding ring seal means including a sleeve surrounding a portion of said rotor rotatable therewith and having a main portion and an end portion which is provided with an external circumferential groove; an inner annular housing surrounding said main portion and having an outwardly directed radial flange in the region of said end portion; an outer annular housing surrounding said inner annular housing and having an annular end face axially juxtaposed with said flange; connecting means for releasably connecting said flange with said outer annular housing; retaining means for retaining said sleeve against axial movement relative to said rotor and said inner annular housing; and temporary coupling means carried by said inner annular housing in the region of said flange thereof and movable to and from a position in which it extends into said groove for thereby temporarily coupling said inner annular housing with said sleeve against relative axial displacement.

2. An arrangement as defined in claim 1, said retaining means including a circlip lodged in a circumferential groove provided in said rotor adjacent an axial end of said sleeve, said circlip being adapted for engagement with said axial end.

3. An arrangement as defined in claim 1, said temporary coupling means comprising at least one arm pivotally mounted on an end face of said inner annular housing for movement to and from said position.

4. An arrangement as defined in claim 3, said arm being an eccenter arm.

5. An arrangement as defined in claim 3, said inner annular opening housing having one end provided with an axially directed opening at said end portion and including a removable cover for closing said opening, said arm being mounted on said cover.

6. An arrangement as defined in claim 5, said outer annular housing having a transverse end wall axially spaced from said one end and in the region of the other end of said inner annular housing; and further comprising stationary sealing means in the region of said transverse end wall and operative for sealing the interior of said housing with reference to the ambient atmosphere at least at times.

7. An arrangement as defined in claim 6, said stationary sealing means comprising a hollow annular member of elastically distendable material surrounding a portion of said rotor with clearance, and distending means communicating with the interior of said hollow annular member for distending the latter into sealing engagement with said portion of said rotor.

8. An arrangement as defined in claim 7, saud transverse end wall having an aperture through which said rotor extends and which is bounded by a radially inwardly directed face provided with an inner circumferential groove, said hollow annular member being seated in said inner circumferential groove; and wherein said distending means comprises a passage communicating with the interior of said hollow annular member and adapted to communicate with a source of pressurized fluid.

9. An arrangement as defined in claim 6, said stationary sealing means comprising a pair of cooperating sealing rings.

* * * * *